(12) United States Patent
Sivertsson et al.

(10) Patent No.: US 11,541,776 B2
(45) Date of Patent: Jan. 3, 2023

(54) PARAMETERIZATION OF AN ELECTRIC VEHICLE'S ENERGY CONSUMPTION

(71) Applicant: Volvo Car Corporation, Gothenburg (SE)

(72) Inventors: Martin Sivertsson, Gothenburg (SE); Viktor Larsson, Gothenburg (SE)

(73) Assignee: VOLVO CAR CORPORATION, Gothenburg (SE)

(*) Notice: Subject to any disclaimer, the term of this patent is extended or adjusted under 35 U.S.C. 154(b) by 291 days.

(21) Appl. No.: 16/852,955

(22) Filed: Apr. 20, 2020

(65) Prior Publication Data
US 2021/0323439 A1 Oct. 21, 2021

(51) Int. Cl.
*B60L 58/12* (2019.01)
*G06N 20/00* (2019.01)
*G01C 21/34* (2006.01)

(52) U.S. Cl.
CPC .......... *B60L 58/12* (2019.02); *G01C 21/3469* (2013.01); *G06N 20/00* (2019.01); *B60L 2240/12* (2013.01); *B60L 2240/60* (2013.01)

(58) Field of Classification Search
CPC .. B60L 58/12; B60L 2240/12; B60L 2240/60; B60L 2240/62; B60L 2240/642; B60L 2240/662; B60L 2260/44; B60L 2260/54; G01C 21/3469; G06N 20/00; Y02T 10/70; Y02T 90/16
See application file for complete search history.

(56) References Cited

U.S. PATENT DOCUMENTS

2022/0067850 A1* 3/2022 Bhasme .............. B60L 15/2045

OTHER PUBLICATIONS

"Tesla Touchscreen | Navigation App." Tesla, https://www.youtube.com/watch?v=V0KDiENEsHU. Last Accessed Apr. 20, 2020. 2 Pages.
"Model S Owner's Manual" Tesla, Apr. 2020. 226 pages.
Shahan, Zacharay "Tesla Smart Navigation Is Brilliant (+ 3 Tips)." Clean Technica, tesla-smart-navigation-brilliant-3-tips-long-trip, Jul. 16, 2017. 6 pages.
"E-TRON" Audi, https://www.audiusa.com/models/audi-e-tron. Last Accessed Apr. 20, 2020. 14 pages.

(Continued)

*Primary Examiner* — Alan D Hutchinson
(74) *Attorney, Agent, or Firm* — Amin, Turocy & Watson, LLP

(57) ABSTRACT

Techniques regarding parameterizing energy consumption of an electric vehicle are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a vehicle state estimation component that determines an operating condition experienced by a vehicle while traveling a route. Further, the system can comprise an energy consumption component that parametrizes an amount of energy expended by the vehicle while traveling the route based on a loss table that is populated with an energy consumption value derived from historic operation of the vehicle at the operating condition.

20 Claims, 10 Drawing Sheets

(56) References Cited

OTHER PUBLICATIONS

"Unlock myAudi: e-tron Route Planner." Audi USA, https://www.youtube.com/watchv=kW34M3eEs3l&list=PLXXOtTBF8wv-h79dXYAWUvD6aLYffaO_dd&index=18&t=0s. Last Accessed Apr. 20, 2020. 2 pages.

"MERCEDES-BENZ—Charging & Range" Mercedes-Benz the best or nothing, https://www.mercedes-benz.se/passengercars/mercedes-benz-cars/models/eqc/charging-and-range/eq-remote-details.module.html. Last Accessed Apr. 20, 2020. 7 pages.

"MERCEDES-BENZ—EQC" Mercedes-Benz, https://www.mercedes-benz.se/passengercars/mercedes-benz-cars/models/eqc/explore/footnote.module.html, Last Accessed Apr. 20, 2020, 5 pages.

\* cited by examiner

PARAMETERIZATION OF AN ELECTRIC VEHICLE'S ENERGY CONSUMPTION

TECHNICAL FIELD

Embodiments disclosed and claimed herein relate to the parameterization of an electric vehicle's energy consumption, and more specifically, to generating input parameters for a vehicle energy model that can be used to coordinate navigation routes for electric vehicles.

BACKGROUND

Electric vehicles can have limited range and/or long re-fueling times compared to conventional combustion engine vehicles. Intelligent trip planning can coordinate an electric vehicle's navigation to minimize delays and/or limitations caused by re-fueling. For example, intelligent trip planning can consider whether the desired destination can be reached with the current battery energy level of the electric vehicle. The intelligent trip planning can also predict an energy level of the battery upon reaching the destination, and/or the location of charging stations. Further, the re-fueling time and/or amount of charge needed to reach the destination can also be incorporated into the intelligent trip planning. Thus, accurate measurements and/or predictions of the electric vehicle's energy consumption can play an important role in establishing the vehicle's navigation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can parametrize an electric vehicle's energy consumption are described.

The development of intelligent trip plans can be facilitated by one or more vehicle energy models, which can incorporate artificial intelligence algorithms. However, the effectiveness of the vehicle energy models can be dependent upon the quality of input parameters regarding the vehicle's route, operating state, and/or condition. Conventional parameterizations use constant and/or predefined energy consumption parameter values as inputs to the vehicle energy model; thereby neglecting to adapt to unique driving styles and/or actual energy consumption experienced by the electric vehicle. An alternate parameterization methodology can update the energy consumption parameters using machine learning. However, machine learning parameterization can be computationally demanding and generally not feasible to implement in an on-board electronic control unit ("ECU") having limited computational performance.

Given the problems with other implementations of parameterizing real-time energy consumption of a target electric vehicle; the present disclosure can be implemented to produce a solution to one or more of these problems by parameterizing energy consumption via energy loss mapping that can incorporate measured energy demands that have been historically experienced by the vehicle in response to one or more conditions of travel. Advantageously, one or more embodiments described herein can parameterize energy consumption based on unique operating conditions of the vehicle and/or unique travel demands of a navigated route. Further, various embodiments described herein can be implemented in an on-board ECU without the need for high performance computer resources.

According to an embodiment, a system is provided. The system can comprise a processor that can execute computer executable components stored in a memory. The system can also comprise a vehicle state estimation component that determines an operating condition experienced by a vehicle while traveling a route. Further, the system can comprise an energy consumption component that parametrizes an amount of energy expended by the vehicle while traveling the route based on a loss table that is populated with an energy consumption value derived from historic operation of the vehicle at the operating condition.

In some implementations, the system can further comprise a drivetrain loss component that can generate the energy consumption value populated within the loss table. Also, the energy consumption value can characterize an energy efficiency of a drivetrain of the vehicle at the operating condition based on the historic operation of the vehicle.

According to an embodiment, a computer-implemented method is provided. The computer-implemented method can comprise determining, by a device operatively coupled to a processor, an operating condition experienced by a vehicle while traveling a route. The computer-implemented method can also comprise parametrizing, by the device, an amount of energy expended by the vehicle while traveling the route based on a loss table that is populated with an energy consumption value derived from historic operation of the vehicle at the operating condition.

In some implementations, the computer-implemented method can also comprise generating, by the device, an energy load prediction associated with energy consumption of an auxiliary subsystem of the vehicle while the vehicle is traveling the route.

According to an embodiment, a computer program product for parameterizing vehicle energy consumption is provided. The computer program product can comprise a computer readable storage medium having program instructions embodied therewith. The program instructions can be executable by a processor to cause the processor to: determine an operating condition experienced by a vehicle while traveling a route. The program instructions can further cause the processor to parametrize an amount of energy expended by the vehicle while traveling the route based on a loss table that is populated with an energy consumption value derived from historic operation of the vehicle at the operating condition.

In some implementations, the program instructions can also cause the processor to parametrize an amount of energy stored within a battery of the vehicle and an energy loss value associated with the battery at the operating condition.

DETAILED DESCRIPTION

Figure 1:
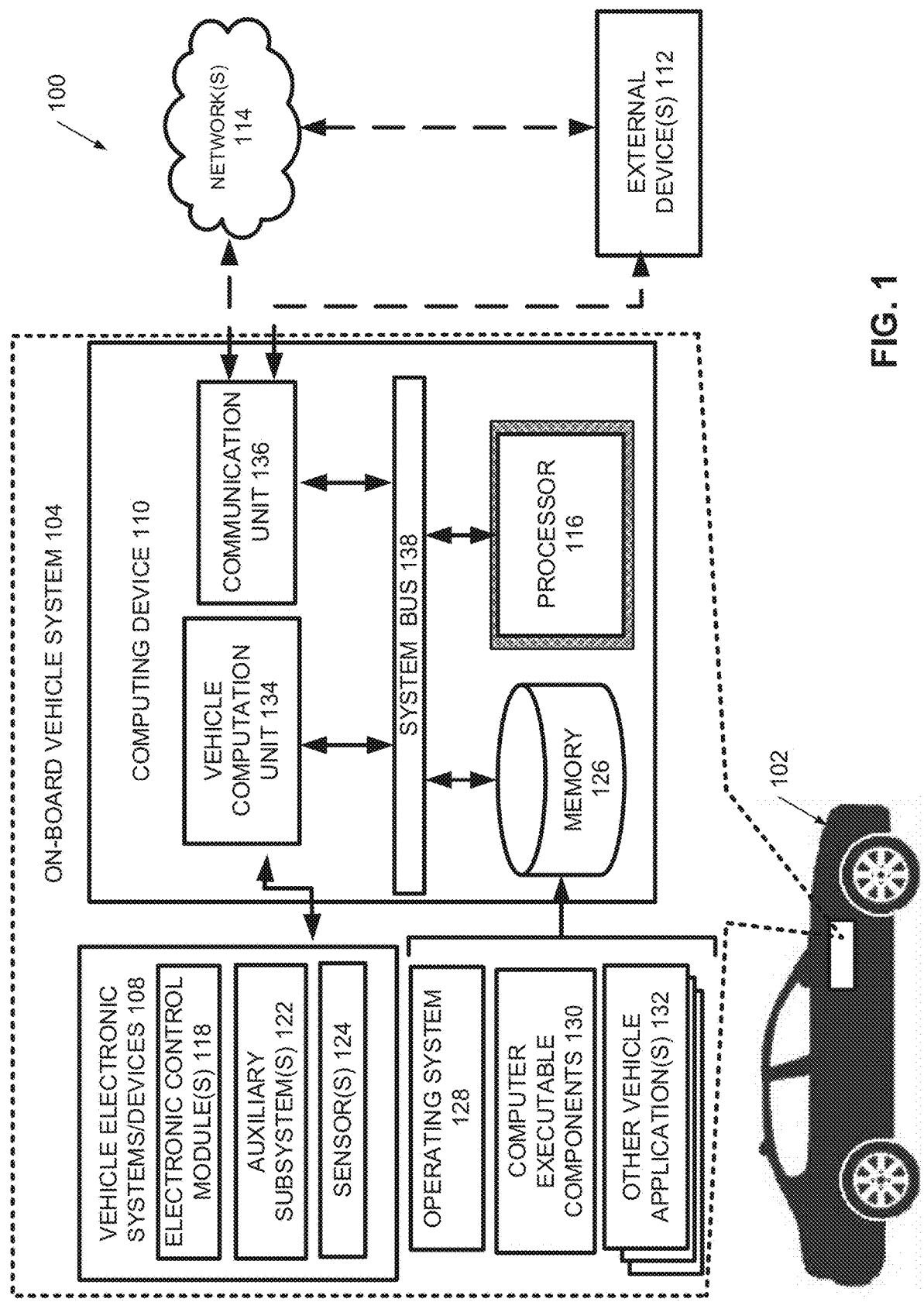
FIG. 1 illustrates a block diagram of an example, non-limiting system that can facilitate parameterizing energy consumption of an electric vehicle via one or more energy loss mapping procedures in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Various embodiments of the present invention can be directed to computer processing systems, computer-implemented methods, apparatus and/or computer program products that facilitate the efficient, effective, and autonomous (e.g., without direct human guidance) on-board parameterization of an electric vehicle's energy consumption and/or operating condition for a vehicle energy model. For example, one or more embodiments described herein can parameterize data regarding an electric vehicle's: battery energy level, battery energy loss, operating condition (e.g., characterizing a condition of the vehicle and/or an environment experienced by the vehicle), and/or energy demands (e.g., energy loss associated with the vehicle's transmission, electrical motor, and/or auxiliary subsystems). Further, one or more embodiments described herein can be performed in real-time on board the electric vehicle while adapting to characteristics unique to the electric vehicle, such as a driving style and/or travel route.

The computer processing systems, computer-implemented methods, apparatus and/or computer program products employ hardware and/or software to solve problems that are highly technical in nature (e.g., monitoring and parameterization of an electric vehicle's energy consumption), that are not abstract and cannot be performed as a set of mental acts by a human. For example, an individual, or a plurality of individuals, cannot measure and parameterize various energy consumption measurements while an electric vehicle is being operated. For instance, operation of the vehicle inherently renders the energy consumption measurements inconstant, requiring a speed of analysis that cannot be achieved by a human.

Also, one or more embodiments described herein can constitute a technical improvement over conventional vehicle energy model parameterizations by incorporating an approach that is adaptive to the historical operating performance of the electric vehicle with less costly computational resources than conventional machine learning technologies. Additionally, various embodiments described herein can demonstrate a technical improvement over conventional vehicle energy model parameterizations by incorporating actual energy demands of the vehicle based on historic experience; rather, than mere value constants or predictions. For example, various embodiments described herein can map energy loss previously experienced by the vehicle is response to various operating conditions via one or more loss tables.

Further, one or more embodiments described herein can have a practical application by generating energy vehicle model input parameters that characterize actual energy consumption of an electric vehicle based on past, measured and/or monitored energy demands experienced by the vehicle. For instance, various embodiments described herein can incorporate historic energy consumption values regarding the vehicle's past experience in: operating an auxiliary subsystem, traversing a particular route; traversing a particular terrain (e.g., road slope); operating in a particular environment; operating with a given driving style, operating at a particular speed, a combination thereof, and/or the like. One or more embodiments described herein can control one or more vehicle computation units. Thereby, the one or more embodiments, can utilize the controller area network of an electric vehicle to collect data regarding various operating states of the vehicle in response to one or more conditions, and/or parameterize the data on board the vehicle (e.g., in real-time).

FIG. 1 illustrates a block diagram of an example, non-limiting system 100 that facilitates parameterizing energy consumption of an electric vehicle 102 in accordance with one or more embodiments described herein. In accordance with various exemplary embodiments, system 100 can be deployed on or within the electric vehicle 102, (e.g., an automobile, as shown in FIG. 1). Although FIG. 1 depicts the electric vehicle 102 as an automobile, the architecture of the system 100 is not so limited. For instance, the system 100 described herein can be implemented with a variety of types of electric vehicles 102. Example electric vehicles 102 that can incorporate the exemplary system 100 can include, but are not limited to: automobiles, airplanes, trains, motorcycles, carts, trucks, semi trucks, buses, boats, recreational vehicles, helicopters, jets, scooters, a combination thereof, and/or the like.

As shown in FIG. 1, the system 100 can comprise one or more on-board vehicle systems 104, which can include one or more vehicle electronic systems and/or devices 108, and/or one or more computing devices 110. Additionally, the system 100 can comprise one or more external devices 112 that can be communicatively and/or operatively coupled to the one or more computing devices 110 of the one or more on-board vehicle systems 104 either via a one or more networks 114 and/or a direct electrical connection (e.g., as shown in FIG. 1). In various embodiments, the one or more computing devices 110 can comprise an infotainment head unit and/or the like that can post-process and/or format one or more parameterizations generated by the on-board vehicle system 104. Further, in one or more embodiments, the one or more computing devices 110 can communicate with the one or more external devices 112. The one or more external devices 112 can generate, execute, and/or manage one or more vehicle energy models, and the post-processing and/or formatting performed by the one or more computing devices 110 can render the parameterizations compatible with one or more data requirements of the vehicle energy models or external devices 112. For example, parameterizations generated by the on-board vehicle system 104 and formatted by the computing devices 110 can be communicated to the one or more external devices 112 to initialize vehicle energy models and/or facilitate intelligent trip planning, such as navigation computations.

The one or more vehicle electronic systems and/or devices 108 can include one or more additional devices and/or systems of the electric vehicle 102 that can be controlled based at least in part on commands issued by the one or more computing devices 110 (e.g., via one or more processing units 116) and/or commands issued by the one or more external devices 112 communicatively coupled thereto. For example, the one or more other vehicle electronic systems and/or devices 108 can include one or more electric control modules 118, auxiliary subsystems 122, and/or sensors 124.

In various embodiments, the one or more electric control modules 118, auxiliary subsystems 122, and/or sensors 124 can communicate with each other and/or the one or more computing devices 110 (e.g., via a direct electrical connection, a wireless connection, a controller area network, and/or like) to share data and/or facilitate computations. One of ordinary skill in the art will recognize that the one or more electric control modules 118 can control one or more electrical systems and/or subsystems of the electric vehicle 102 to control various vehicle operations. Example modules that can be comprised within the one or more electric control modules 118, can include, but are not limited to: engine control modules ("ECMs"), powertrain control modules ("PCMs"), transmission control modules ("TCMs"), brake control modules ("BCMs"), central control modules ("CCMs"), central timing modules ("CTMs"), general electronic modules ("GEMs"), body control modules ("BCM"), suspension control modules ("SCMs"), battery electronic control modules ("BECMs" a combination thereof, and/or the like. For example, the one or more electronic control modules 118 can include one or more ECMs that can collect, analyze, control, and/or share data regarding operation of the electric vehicle's 102 engine. In another example, the one or more electronic control modules 118 can include one or more BECMs that can collect, analyze, control, and/or share data regarding operation of the electric vehicle's 102 battery.

Further, one of ordinary skill in the art will recognize that the one or more auxiliary subsystems 122 can include one or more control modules, electronics, and/or sensors that can analyze, regulate, and/or control non-essential features of the electric vehicle 102. Example non-essential features that can be analyzed, regulated, and/or controlled by the auxiliary subsystem 122 can include, but are not limited to: air conditioning systems, music systems (e.g., speakers and/or radio components), electronic pairing systems (e.g., pairing between computerized devices, such as smart phones, tablets, and the like, to facilitate data and/or energy sharing), voice control systems, lighting systems, display systems, data streaming systems, windshield wiper systems, high voltage coolant heater ("HVCH") systems, a combination thereof, and/or the like. Moreover, the one or more sensors 124 can detect and/or measure data throughout the electric vehicle 102 and/or environmental conditions. In various embodiments, the one or more sensors 124 can share data with the one or more electronic control modules 118 and/or auxiliary subsystems 122 to facilitate vehicle operation. Further, the one or more sensors 124 can share data with the one or more computing devices 110 to facilitate one or more parameterizations of vehicle operation. For instance, the one or more sensors 124 can measure and/or detect data characterizing the state and/or operation of one or more mechanical parts of the electric vehicle 102. In another instance, the one or more sensors 124 can measure and/or detect data characterizing a condition of the environment experienced by the electric vehicle 102 (e.g., such as ambient temperature and/or amount of moisture within and/or outside the electric vehicle 102).

The one or more computing devices 110 can facilitate executing and controlling one or more operations of the electric vehicle 102, including one or more operations of the one or more other vehicle electronic systems/devices 108 using machine-executable instructions. In this regard, embodiments of system 100 and other systems described herein can include one or more machine-executable components embodied within one or more machines (e.g., embodied in one or more computer readable storage media associated with one or more machines, such as computing device 110). Such components, when executed by the one or more machines (e.g., processors, computers, virtual machines, etc.) can cause the one or more machines to perform the operations described.

For example, the one or more computing devices 110 can include or be operatively coupled to at least one memory 126 and/or at least one processing unit 116. The one or more processing units 116 can be any of various available processors. For example, dual microprocessors and other multiprocessor architectures also can be employed as the processing unit 116. In various embodiments, the at least one memory 118 can store software instructions embodied as functions and/or applications that when executed by the at least one processing unit 116, facilitate performance of operations defined by the software instruction. In the embodiment shown, these software instructions can include one or more operating systems 128, one or more computer-executable components 130, and/or one or more other vehicle applications 132. For example, the one or more operating systems 128 can act to control and/or allocate resources of the one or more computing devices 110. It is to be appreciated that the claimed subject matter can be implemented with various operating systems or combinations of operating systems.

The one or more computer executable components 130 and/or the one or more other vehicle applications 132 can take advantage of the management of resources by the one or more operating systems 128 through program modules and program data also stored in the one or more memories 126. The one or more computer executable components 130 can provide various features and/or functionalities that can facilitate parameterizing energy consumption and/or operating conditions of the electric vehicle 102. For example, other vehicle applications 132 can include, but are not limited to: a navigation application, a media player application, a phone application, a vehicle settings application, a parking assistance application, an emergency roadside assistance application, a combination thereof, and/or the like. The features and functionalities of the one or more computer executable components 130 are discussed in greater detail infra.

The one or more computing devices 110 can further include one or more vehicle computation units 134, one or more communication units 136, and a system bus 138 that can communicatively couple the various features of the one or more computing devices 110 (e.g., the one or more vehicle computation units 134, the one or more communication units 136, the one or more memories 126, and/or the one or more processing units 116).

In various embodiments, the one or more vehicle computation units 134 can communicate and/or share data with the one or more vehicle electronic systems and/or devices 108. Further the one or more vehicle computation units 134 can execute one or more computer executable components 130 (e.g., stored in the memory 126) to facilitate one or more parameterizations of the electric vehicle's energy consumption. In one or more embodiments, the one or more vehicle computation units 134 (e.g., facilitated by the one or more vehicle electronic systems and/or devices 108 and/or computer executable components 130) can parameterize at least the following regarding the electric vehicle's 102 energy consumption: an energy level of the electric vehicle's 102 battery (e.g., via one or more BECMs), an energy loss value of the electric vehicle's 102 battery, a vehicle road load coefficient value and/or mass value, an energy loss value related to the electric vehicle's 102 transmission and/or electrical motor (e.g., based on one or more operating conditions of the electric vehicle 102, such as environmental conditions and/or driving styles experienced by the electric vehicle while traveling a route), an energy demand for the one or more auxiliary subsystems 122, a combination thereof, and/or the like. Furthermore, the one or more computing devices 110 can pre-process and/or format the one or more parameterizations of the one or more vehicle computation units 134 in accordance with one or more data requirements of the one or more external devices 112. For instance, the one or more computer devices 110 can render the one or more parameterizations of the one or more vehicle computation units 134 compatible with one or more vehicle energy models.

The one or more communication units 136 can include suitable hardware and/or software that can facilitate connecting one or more external devices 112 to the one or more computing devices 110 (e.g., via a wireless connection and/or a wired connection). For example, the one or more communication units 128 can be operatively coupled to the one or more external devices 112 via one or more networks 114. The one or more networks 114 can include wired and/or wireless networks, including but not limited to, a personal area network ("PAN"), a local area network ("LAN"), a cellular network, a wide area network ("WAN", e.g., the Internet), and the like. For example, the one or more external devices 112 can communicate with the one or more computing devices 110 (and vice versa) using virtually any desired wired or wireless technology, including but not limited to: wireless fidelity ("Wi-Fi"), global system for mobile communications ("GSM"), universal mobile telecommunications system ("UMTS"), worldwide interoperability for microwave access ("WiMAX"), enhanced general packet radio service (enhanced "GPRS"), fifth generation partnership project ("5G") communication system, third generation partnership project ("3GPP") long term evolution ("LTE"), third generation partnership project 2 ("3GPP2") ultra-mobile broadband ("UMB"), high speed packet access ("HSPA"), Zigbee and other 802.XX wireless technologies and/or legacy telecommunication technologies, near field communication ("NFC") technology, BLUETOOTH®, Session Initiation Protocol ("SIP"), ZIGBEE®, RF4CE protocol, WirelessHART protocol, 6LoWPAN (IPv6 over Low power Wireless Area Networks), Z-Wave, an ANT, an ultra-wideband ("UWB") standard protocol, and/or other proprietary and non-proprietary communication protocols. In this regard, the one or more communication units 136 can include software, hardware, or a combination of software and hardware that is configured to facilitate wired and/or wireless communication between the one or more computing devices 110 and the one or more external devices 112. While the one or more communication units 136 are shown for illustrative clarity as a separate unit that is not stored within memory 126, it is to be appreciated that one or more (software) components of the communication unit can be stored in memory 126 and include computer executable components.

The one or more external devices 112 can include any suitable computing device that can communicate with the one or more computing devices 110 comprised within the on-board vehicle system 104 and interface with the one or more computing devices 110 (e.g., using a suitable application program interface ("API")). For example, the one or more external devices 112 can include one or more computer servers, and/or can be comprised within one or more cloud computing environments.

Figure 2:
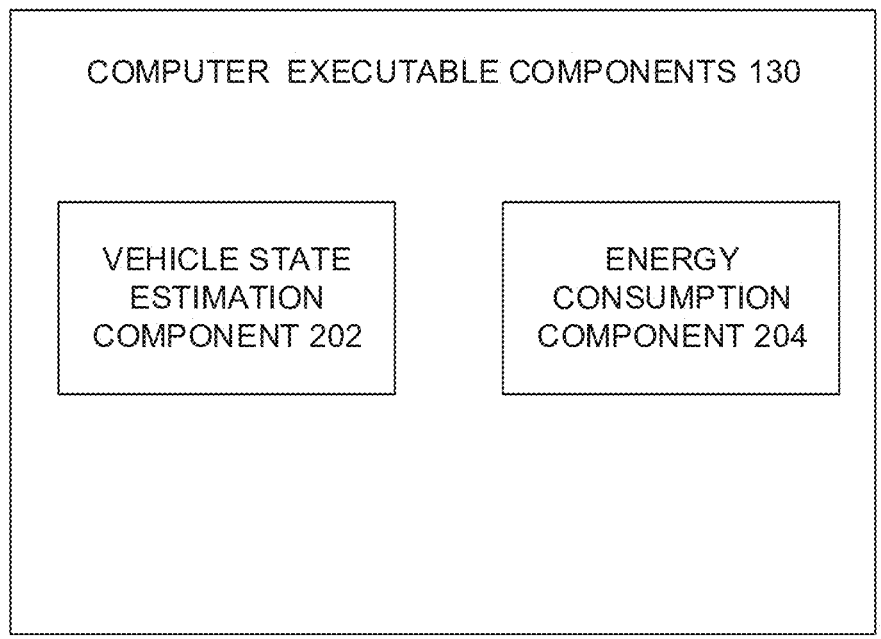
FIG. 2 illustrates a block diagram of example, non-limiting computer executable components that can facilitate determining an operating condition and/or energy consumption of an electric vehicle in accordance with one or more embodiments described herein.

FIG. 2 illustrates a block diagram of example, non-limiting computer executable components 130 that can facilitate parameterizing energy consumption of the electric vehicle 102 in accordance with one or more embodiments described herein. Repetitive description of like elements employed in other embodiments described herein is omitted for sake of brevity. As shown in FIG. 2, the one or more computer executable components 130 can include vehicle state estimation component 202 and/or energy consumption component 204. Also, the vehicle state estimation component 202 and the energy consumption component 204 can communicate and/or share data with each other to facilitate one or more parameterizations by the one or more vehicle computation units 134.

In various embodiments, the vehicle state estimation component 202 can facilitate the one or more vehicle computation units 134 in parameterizing a state of the electric vehicle 102 based on data shared by the one or more vehicle electronic systems and/or devices 108. The state of the electric vehicle 102 can regard, for example, one or more batteries of the electric vehicle 102. For instance, data regarding the electric vehicle's 102 one or more batteries can be collected, analyzed, and/or shared by one or more BECMs of the one or more electronic control modules 118. Further, the state of the electric vehicle 102 can regard, for example, one or more environmental conditions experienced by the electric vehicle 102 (e.g., weather conditions such as temperature, rain, and/or snow). For instance, data regarding the one or more environmental conditions can be collected, analyzed, and/or shared by the one or more sensors 124 and/or one or more external devices 112 in communication with the one or more computing devices 110 (e.g., weather monitoring systems). Moreover, the state of the electric vehicle 102 can regard, for example, a mass of the electric vehicle 102 and/or one or more vehicle road load coefficients. For instance, data regarding the electric vehicle's 102 mass and/or vehicle road load coefficients can be stored in the one or more memories 126; collected, analyzed, and/or shared by the one or more vehicle electronic systems and/or devices 108 and/or sensors 124; and/or a combination thereof. Additionally, the state of the electric vehicle 102 can regard, for example, a speed of the electric vehicle 102.

In one or more embodiments, the energy consumption component 204 can facilitate the one or more vehicle computation units 134 in parameterizing energy demands based on data shared by the one or more vehicle electronic systems and/or devices 108. The energy demands can regard energy required to propel the electric vehicle 102 in light of the state of the electric vehicle 102. For instance, data regarding drivetrain energy loss can be incorporated into a parameterization of the electric vehicle's 102 energy demands. Further, the energy demands can regard energy required to operate one or more of the auxiliary subsystems 122. For instances, the energy consumption component 204 can update one or more parameterized energy demands in response to activation or deactivation of one or more of the auxiliary subsystems 122.

Figure 3:
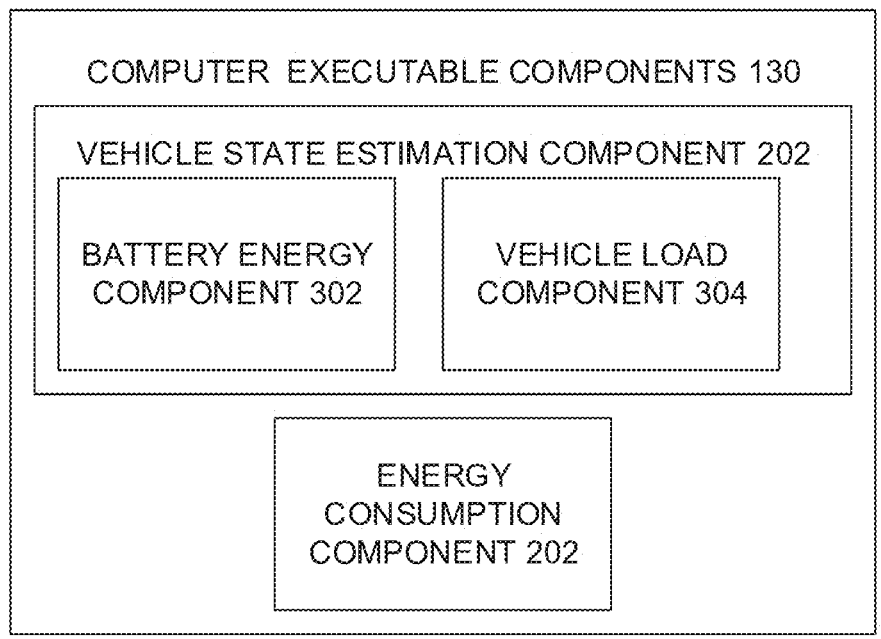
FIG. 3 illustrates a block diagram of example, non-limiting computer executable components that can facilitate parameterizing amount of energy, stored, expended, and/or lost by a battery during operation of an electric vehicle in accordance with one or more embodiments described herein.

FIG. 3 illustrates a block diagram of example, non-limiting computer executable components 130 that can facilitate parameterizing that state the electric vehicle 102 in accordance with one or more embodiments described herein. Repetitive description of like elements employed in other embodiments described herein is omitted for sake of brevity. As shown in FIG. 3, the vehicle state estimation component 202 can include one or more battery energy components 302 and/or vehicle load components 304. Also, the battery energy component 302 and the vehicle load component 304 can communicate and/or share data with each other to facilitate one or more parameterizations by the one or more vehicle computation units 134. In one or more embodiments, the battery energy component 302 and the vehicle load component 304 can be executed by the same vehicle computation unit 134 or by separate vehicle computation units 134.

In one or more embodiments, the battery energy component 302 can facilitate the one or more vehicle computation units 134 in parameterizing an energy level of the electric vehicle's 102 one or more batteries. For example, the battery energy component 302 can retrieve data from the one or more electronic control modules 118 (e.g., one or more BECMs) and/or memories 118 regarding: the current energy level of the one or more batteries, the total energy capacity of the one or more batteries, a max regeneration rate and/or power for the one or more batteries, a combination thereof, and/or the like. Further the battery energy component 302 can parameterize energy loss inherent to the one or more batteries, for example, based on one or more determinations by the one or more electronic control modules 118 (e.g., one or more BECMs). For instance, inherent energy loss can include, for example, parasitic energy drain and/or internal energy loss of the one or more batteries. In one or more embodiments, the battery energy component 302 can determine the energy loss based further on the state of the electric vehicle 102, such as environmental temperature and/or the temperature of the one or more batteries. Additionally, the battery energy component 302 can determine the energy loss based on one or more battery characteristics known to the battery manufacturer and/or stored in the one or more memories 118.

In one or more embodiments, the vehicle load component 304 can facilitate the one or more vehicle computation units 134 in parameterizing a mass of the electric vehicle 102, a speed of the electric vehicle 102, a terrain characteristic experienced by the electric vehicle 102 (e.g., a slope and/or gradient of a road traversed by the electric vehicle 102), and/or one or more road load coefficients regarding the electric vehicle 102. For example, the vehicle load component 304 can determine a mass of the electric vehicle 102 based on a predefined mass (e.g., stored in the one or more memories 126) and/or one or more measurements from the one or more sensors 124. For instance, a predefined mass value for the electric vehicle 102 can be stored in the one or more memories 126. The predefined mass value can be augmented based on one or more measurements from one or more sensors 124, such as pressure sensors positioned adjacent to one or more seating structures and/or cargo storage structures of the electric vehicle 102. For instance, wherein an object is supported by one or more seats of the electric vehicle 102, the one or more sensors 124 can detect a pressure caused by the object's weight and vehicle load component 304 can correlate the pressure measurement with a mass of the object, which can be added to the predefined mass of the electric vehicle 102. In another instance, sensors 124 such as accelerometer sensors and/or road inclination sensors can be utilized to collect data for the parameterizations.

Figure 4:
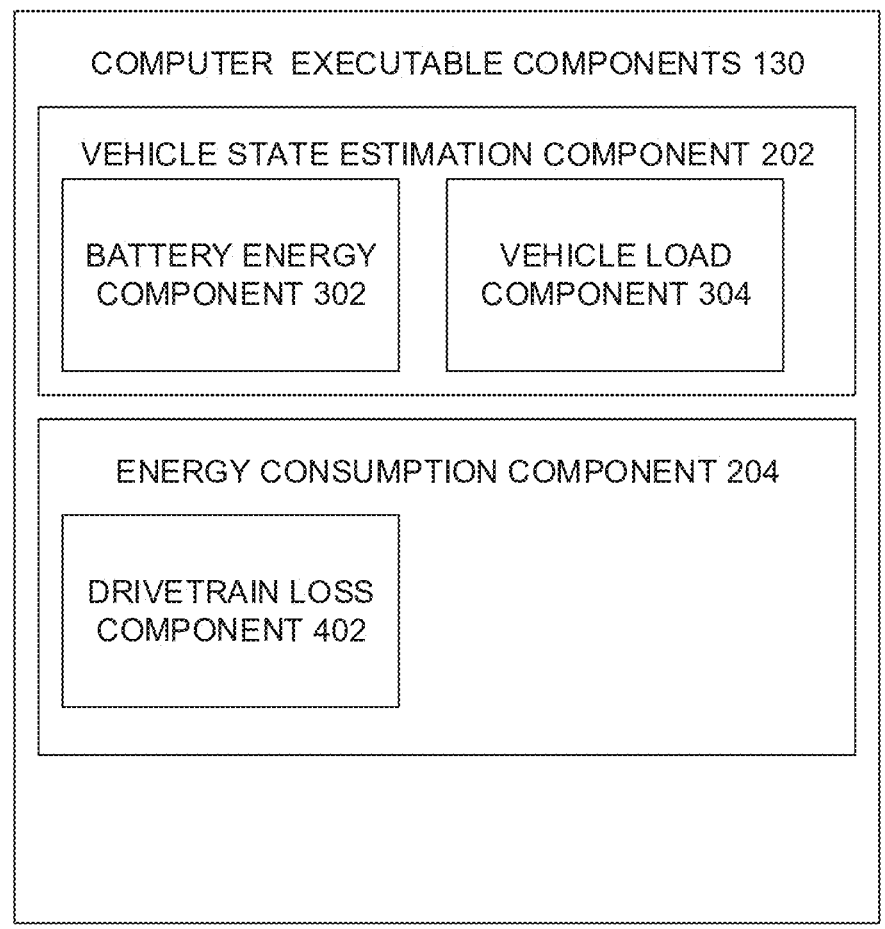
FIG. 4 illustrates a block diagram of example, non-limiting computer executable components that can facilitate incorporating a drivetrain energy loss value into parameterization of an electric vehicle's energy consumption in accordance with one or more embodiments described herein.

FIG. 4 illustrates a block diagram of example, non-limiting computer executable components 130 that can facilitate parameterizing one or more energy demands of the electric vehicle 102 in accordance with one or more embodiments described herein. Repetitive description of like elements employed in other embodiments described herein is omitted for sake of brevity. As shown in FIG. 4, the energy consumption component 204 can include one or more drivetrain loss components 402.

In various embodiments, the drivetrain loss component 402 can facilitate the one or more vehicle computation units 134 in parameterizing energy demands associated with propelling the electric vehicle 102 along a designate travel route. For example, the drivetrain loss component 402 can parameterize drivetrain energy loss estimated to be experienced by an electric vehicle 102 while traversing a designated travel route based on historical data via one or more loss tables that can map the electric vehicle's 102 energy consumption. For instance, the drive train loss component 402 can parameterize a drivetrain loss value via one or more loss tables that incorporate the slope of the road, the vehicle speed, and mechanical power demand at the wheels of the electric vehicle 102.

A challenge in generating the one or more drivetrain loss tables on-board the electric vehicle 102 can be that only a limited part of the state space will be historically documented during every-day driving. To document all possible energy demands at all possible vehicle speeds; the electric vehicle 102 need be driven at all possible road slopes for each possible vehicle speed. However, the majority of electric vehicles 102 are likely to only have historic experience operating at a narrow road slope range and/or vehicle speed range. The drivetrain loss component 402 can overcome these challenges by first determining historic propulsive energy consumption values for the electric vehicle 102 at a road slope of zero, or substantially zero; and then calculate energy consumption values at various road slopes based on a theoretical loss model initialized using the calculated historic propulsive energy consumption values.

As described herein, while the electric vehicle 102 travels, the on-board vehicle system 104 can collect data regarding the state of the electric vehicle 102 (e.g., vehicle speed, road slope, electrical power of motors, environmental conditions, vehicle mass, road load, and/or like) for a given distance and/or time interval (e.g., via the one or more vehicle electronic systems and/or devices 108). Further, the on-board vehicle system 104 (e.g., via the one or more vehicle computation units 134 and/or vehicle state estimation components 202) can store the data in one or more historic datasets within the one or more memories 126. Thereby the historic datasets can characterize past driving conditions uniquely experienced by the electric vehicle 102 (e.g., as opposed to generalized values not adapted to conditions experienced by the electric vehicle 102).

The drivetrain loss component 402 can analyze the historic datasets to calculate the historic propulsive energy consumption values that can be used to initialize the drivetrain loss model; thereby, estimating drivetrain energy loss for a designated travel route based on historic driving conditions of the electric vehicle 102. For each distance and/or time interval comprised within the one or more historic datasets, the drivetrain loss component 402 can calculate an average for the various data categories characterizing the state of the electric vehicle 102. For example, given a historic distance and/or time interval, the drivetrain loss component 402 can calculate an average value for one or more the following exemplary data categories comprised within the historic dataset: vehicle speed, road slope, electrical power of the electric vehicle's motors, auxiliary power, battery temperature, vehicle mass, road load, a combination thereof, and/or the like.

Further, the drivetrain loss component 402 can define one or more speed bins that can be associated with the calculated historic propulsive energy consumption values. For example, each speed bin can correlate to historic distance and/or time intervals associated with a defined vehicle speed range. For example, a first speed bin can correlate to historic distance and/or time intervals associated with an average vehicle speed within a first range (e.g., greater than or equal to 2.5 kilometers per hour (km/h) and less than or equal to 7.5 km/h); whereas a second speed bin can correlate to historic distance and/or time intervals associated with an average vehicle speed within a second range (e.g., greater than or equal to 7.6 km/h and less than or equal to 12.5 km/h). The number of speed bins and/or the correlated vehicle speed ranges can be defined by the drivetrain loss component 402. Additionally, the drivetrain loss component 402 can group the historic distance and/or time intervals, along with the associate historic driving condition data, into the speed bins based on the average vehicle speed calculated for each interval.

Moreover, the drivetrain loss component 402 can analyze the calculated averages for each historic distance and/or time interval grouped in the speed bins to filter out historic driving conditions that do not characterize propulsive energy consumption at a zero, or near zero, road slope. For example, the drivetrain loss component 402 can analyze the average road slope of the historic distance and/or time intervals. Wherein the average road slope value deviates from a value of zero by more than a defined threshold, the drivetrain loss component 402 can remove the historic distance and/or time intervals from the speed bins, and thereby from the initial historic propulsive energy consumption value determination. The defined threshold of deviation can be determined by the drivetrain loss component 402.

Additionally, the filtering performed by the drivetrain loss component 402 can remove one or more outlier historic driving conditions, despite the outlier historic driving conditions having an average road slope less than the threshold of deviation. For example, the drivetrain loss component 402 can analyze the average power demand of the historic distance and/or timing intervals. Wherein the average power demand deviates from a defined power range, the drivetrain loss component 402 can remove the historic distance and/or time intervals from the speed bins, and thereby from the initial historic propulsive energy consumption value determination. The defined power range can be determined by the drivetrain loss component 402. In another example, the drivetrain loss component 402 can analyze the maximum and/or minimum vehicle speeds of the historic distance and/or timing intervals. Wherein the maximum and/or minimum vehicle speeds deviate from the average vehicle speed by more than a defined speed variance threshold, the drivetrain loss component 402 can remove the historic distance and/or time intervals from the speed bins, and thereby from the initial historic propulsive energy consumption value determination.

Subsequent to filtering the historic distance and/or time intervals, the drivetrain loss component 402 can update an exponential moving average ("EMA") filter for respective collective average electrical power demand of the one or more motors for each of the speed bins. For example, for each speed bin, the drivetrain loss component 402 can update the EMA filter for the average electrical power demand across all the historic distance and/or time intervals of the respective speed bin. Thereby, the drivetrain loss component 402 can calculate the historic propulsive energy consumption value for each of the speed bins.

Additionally, the drivetrain loss component 402 can use the historic propulsive energy consumption values to estimate the corresponding power demand for the one or more electrical motors at non-zero road slopes using one or more theoretical models of the motor losses and/or efficiency. Upon determining the power demand for the one or more electric motors at all the desired road slopes, the drivetrain loss component 402 can calculate the corresponding drivetrain energy losses based on a difference between the electrical power demand of the one or more motors and the mechanical power demand at a wheel of the electric vehicle 102.

As the on-board vehicle system 104 continues to collect and/or process new historic data (e.g., further populating the one or more historic datasets), the drivetrain loss component can update the calculations of the historic propulsive energy consumption values, and thereby the corresponding drivetrain energy loss determinations at various road slopes. Additionally, in one or more embodiments, the drivetrain loss component 402 can generate energy loss tables for different environmental conditions (e.g., dry conditions, wet conditions, snow conditions, and/or the like). For example, a first loss table can be populated base on historic distance and/or time intervals that occurred during a first environmental condition (e.g., dry environmental conditions); whereas a second loss table can be populated base on historic distance and/or time intervals that occurred during a second environmental condition (e.g., wet environmental conditions). For instance, the drivetrain loss component 402 can group the historical distance and/or time intervals into environmental condition bins based on the historic driving condition data prior to grouping based on vehicle speed.

In various embodiments, the calculations performed by the drivetrain loss component 402 can be based on energy consumption in watts divided by hours per kilometre (Wh/km) rather than power demand in watts (W); wherein the motivation is that energy consumption in Wh/km unit is the typical unit used to convey energy consumption information for electric vehicles 102. However, it is straight forward to translate from energy consumption to the corresponding power demand, as Wh/km*km/h=W. Further, the vehicle speed and road slope can be generally assumed to be constant for each road segment in a navigation supplier map. Thus, the one or more estimated drivetrain loss tables can capture the energy losses associated with the typical speed fluctuations that are expected for a certain average speed. Each of the collected categories of historic data can therefore be averaged (e.g., via the one or more vehicle computation units 134) during a specified driving distance interval, $d_{lim}$ before they are sampled to the memory 126.

In one or more embodiments, a frequency at which the on-board vehicle system 104 can collect the historic driving condition data (e.g., via the one or more vehicle electronic systems and/or devices 108, vehicle computation units 134, and/or computer executable components 130) can be characterized by Equation 1 below. For example, wherein t (e.g., in seconds (s)) denotes the time passed since the last collection and/or processing of historic data and v (e.g., in meters per second (m/s)) denotes the vehicle speed. The time $t_f$ where the next historic data sample can be taken can be defined by:

$$t_f = \{t | \int_0^t v(t) dt = d_{lim}\} \tag{1}$$

Further, the sampled average propulsive and/or auxiliary energy consumption values can be characterized by Equations 2-3 below (e.g., in Wh/km).

$$\hat{c}_{prop} = \frac{\int_0^{t_f} P_{efad}(t) + P_{erad}(t) dt}{\int_0^{t_f} v(t) dt} \cdot \frac{1}{3.6} \tag{2}$$

$$\hat{c}_{aux} = \frac{\int_0^{t_f} P_{dcdc}(t) + P_{climate}(t) dt}{\int_0^{t_f} v(t) dt} \cdot \frac{1}{3.6} \tag{3}$$

Wherein $P_{erad}$ & $P_{efad}$ (e.g., in W) denote the power of the electric motor at the rear and front axle respectively. While Equations 1-3 regard an electric vehicle 102 having a two electric motor, one of ordinary skill in the art will recognize that the architecture of the various embodiments described herein is not so limited. For example, the electric vehicle 102 can have a plurality of electric motors, wherein Equations 1-3 can sum the power consumption of all the electric motors and/or auxiliary subsystems 122.

Similarly, the sampled average: vehicle mass (e.g., in kilograms (kg)), ambient temperature (e.g., in degrees Celsius (°C.)), vehicle speed (e.g., in m/s), road slope (e.g., in radians), and road load polynomial (e.g., N, N/(m/s), N/(m/s)$^2$) can be characterized by Equations 4-8 below.

$$\hat{m}_{veh} = \frac{\int_0^{t_f} m_{veh}(t) dt}{\int_0^{t_f} 1 dt} \tag{4}$$

$$\hat{T}_{amb} = \frac{\int_0^{t_f} T_{amb}(t) dt}{\int_0^{t_f} 1 dt} \tag{5}$$

$$\hat{v} = \frac{\int_0^{t_f} v(t) dt}{\int_0^{t_f} 1 dt} \tag{6}$$

$$\hat{\theta}_{veh} = \frac{\int_0^{t_f} \theta(t) \cdot v(t) dt}{\int_0^{t_f} 1 dt} \tag{7}$$

$$\hat{f}_{rl,i} = \frac{\int_0^{t_f} f_{rl,i}(t) dt}{\int_0^{t_f} 1 dt}, i = 0, 1, 2 \tag{8}$$

As shown above, Equation 7 can assume a small angle approximation (e.g., sin(θ)=θ). Further, the sampled maximum and/or minimum vehicle speed (e.g., in m/s) during the sampling distance interval can be characterized by Equations 9-10 below.

$$\hat{v}_{min} = \min_{t \in \{0, t_f\}} \{v(t)\} \tag{9}$$

$$\hat{v}_{max} = \max_{t \in \{0, t_f\}} \{v(t)\} \tag{10}$$

As described herein, the sampled vehicle mass value and/or the road load polynomial coefficients can be used to update one or more moving average filters. In one or more embodiments, EMA filters can be used rather than simple moving average filters to increase memory efficiency. For example, the one or more EMA filers can be characterized by recursive Equation 11 below.

$$x(k+1) = \beta \cdot \hat{x} + (1-\beta) \cdot x(k) \tag{11}$$

Wherein β represents the weighting factor, $\hat{x}$ the signal sample, $x_{k+1}$ the updated value of the filter and $x_k$ the current value of the filter.

In various embodiments, the propulsive energy consumption versus average vehicle speed can be estimated by the drivetrain loss component 402 using a set of EMA filters. For example, each EMA filter can represent the typical propulsive energy consumption, along a flat road (e.g., a zero, or near zero, road slope), for a specific speed bin. For instance, $c_{prop}^{v_i}(k)$ can represent the EMA filtered propulsive energy consumption value at sample k and $v_i$ can represent the centre of speed interval i=1, 2, ... N. Given a sample of the propulsive energy consumption, $\hat{c}_{prop}$, the vector notation for the EMA filter update can then be characterized by Equation 12 below.

$$\begin{bmatrix} c_{prop}^{v_1}(k+1) \\ c_{prop}^{v_2}(k+1) \\ \vdots \\ c_{prop}^{v_N}(k+1) \end{bmatrix} = \begin{bmatrix} \lambda_{v_1} \\ \lambda_{v_2} \\ \vdots \\ \lambda_{v_N} \end{bmatrix} \circ \begin{bmatrix} \beta_{v_1} \\ \beta_{v_2} \\ \vdots \\ \beta_{v_N} \end{bmatrix} \hat{c}_{prop} + \tag{12}$$

$$\left( \begin{bmatrix} 1 \\ 1 \\ \vdots \\ 1 \end{bmatrix} - \begin{bmatrix} \lambda_{v_1} \\ \lambda_{v_2} \\ \vdots \\ \lambda_{v_N} \end{bmatrix} \circ \begin{bmatrix} \beta_{v_1} \\ \beta_{v_2} \\ \vdots \\ \beta_{v_N} \end{bmatrix} \right) \circ \begin{bmatrix} c_{prop}^{v_1}(k) \\ c_{prop}^{v_2}(k) \\ \vdots \\ c_{prop}^{v_N}(k) \end{bmatrix},$$

Wherein $\lambda_{v_i}$ determines which, if any, of the speed interval EMA filters that should be updated.

To ensure that the EMA filtered propulsive energy consumption is not updated, when the electric vehicle is driving uphill or downhill or when significant accelerations or decelerations has occurred during the sampling interval (e.g., outlier historic interval and/or timing intervals), several consistency checks be implemented passed λ is set to 1 (e.g., such as the filtering performed by the drivetrain loss component 402 and/or described herein), which can be characterized by the following:

$$\lambda_{v_i} = \begin{cases} 1, & (\hat{v} \in \{v_i - \Delta v_-, v_i + \Delta v_+\}) \wedge (\hat{v}_{min} > v_{min}^{v_i}) \wedge (\hat{v}_{max} < v_{max}^{v_i}) \wedge (\hat{c}_{prop} \in \{c_{min}^{v_i}, c_{max}^{v_i}\}) \wedge (\hat{\theta}_{veh} \in \{\theta_{min}, \theta_{max}\}) \\ 0, & \text{otherwise} \end{cases}$$

Wherein the width of the speed interval is defined by $$\Delta v_- = \frac{v_i - v_{i-1}}{2}, \Delta v_+ = \frac{v_{i+1} - v_i}{2}.$$

The β-parameter for each speed interval can be selected by the drivetrain loss component 402 such that the EMA filter is based on a defined time segment (e.g., last 10-30 minutes) or driving distance (e.g., last 5 to 50 kilometres) of driving for each vehicle speed interval.

In various embodiments, the drivetrain energy loss values for a specific vehicle speed $v_i$ and road slope $\theta_j$ can then be calculated by the drivetrain loss component 402 in accordance with Equations 13-15 below:

$$\text{Loss}_{P_M}(P_M(v_i,\theta_j),v_i) = P_e(v_i,\theta_j) - P_M(v_i,\theta_j) \quad (13)$$

where $$P_e(v_i,\theta_j) = c_{prop}^{v_i} \cdot v_i \cdot 3.6 + v_i \cdot m \cdot g \cdot \sin\theta_j \cdot \eta_\theta(v_i,\theta_j) \quad (14)$$

$$P_M(v_i,\theta_j) = v_i \cdot (f_0 + f_1 \cdot v_i + f_2 \cdot v_i^2 + m \cdot g \cdot \sin\theta_j), \quad (15)$$

and $\eta_\theta$ ($v_i$, $\theta_j$) represents the marginal efficiency of the drivetrain for elevation changes. Wherein $P_{loss}$ represents the total mechanical and electrical losses of the one or more motors and/or transmissions of the electric vehicle 102; $P_E$ represents the total electrical power demand of the one or more motors; "m" represents the EMA filtered vehicle mass; "g" represents the acceleration of gravity; $P_m$ represents the mechanical power at the wheels of the electric vehicle 102; $f_0$, $f_1$, and $f_2$ represent the EMA filtered road load coefficients.

Figure 5:
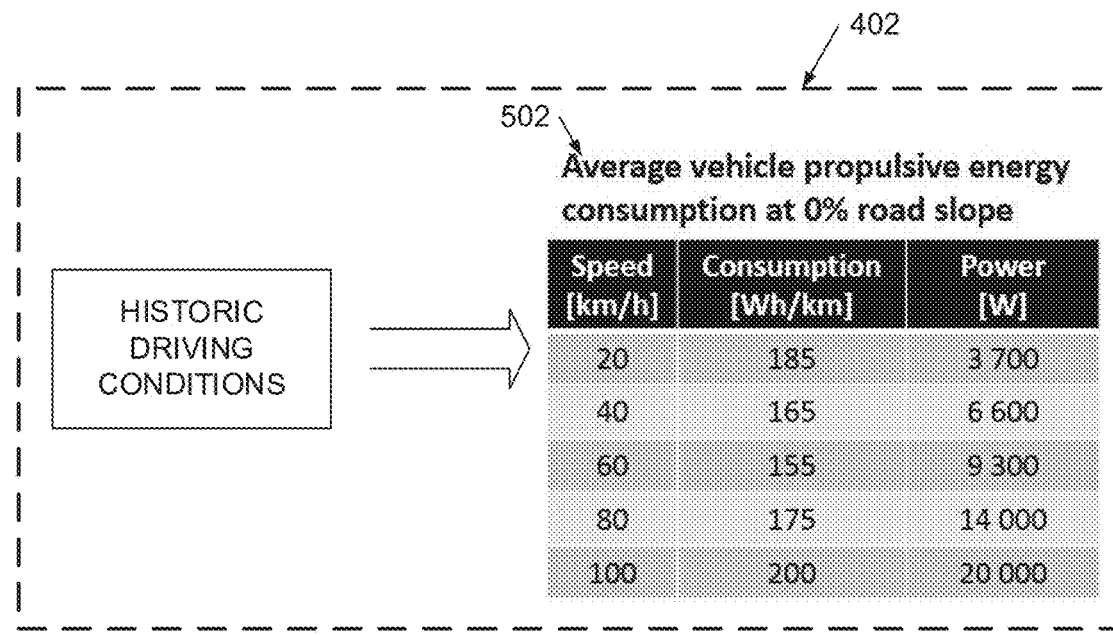
FIG. 5 illustrate a diagram of example, non-limiting graphs that can depict generation of the drivetrain energy loss value of the electric vehicle in accordance with one or more embodiments described herein.
Figure 5:
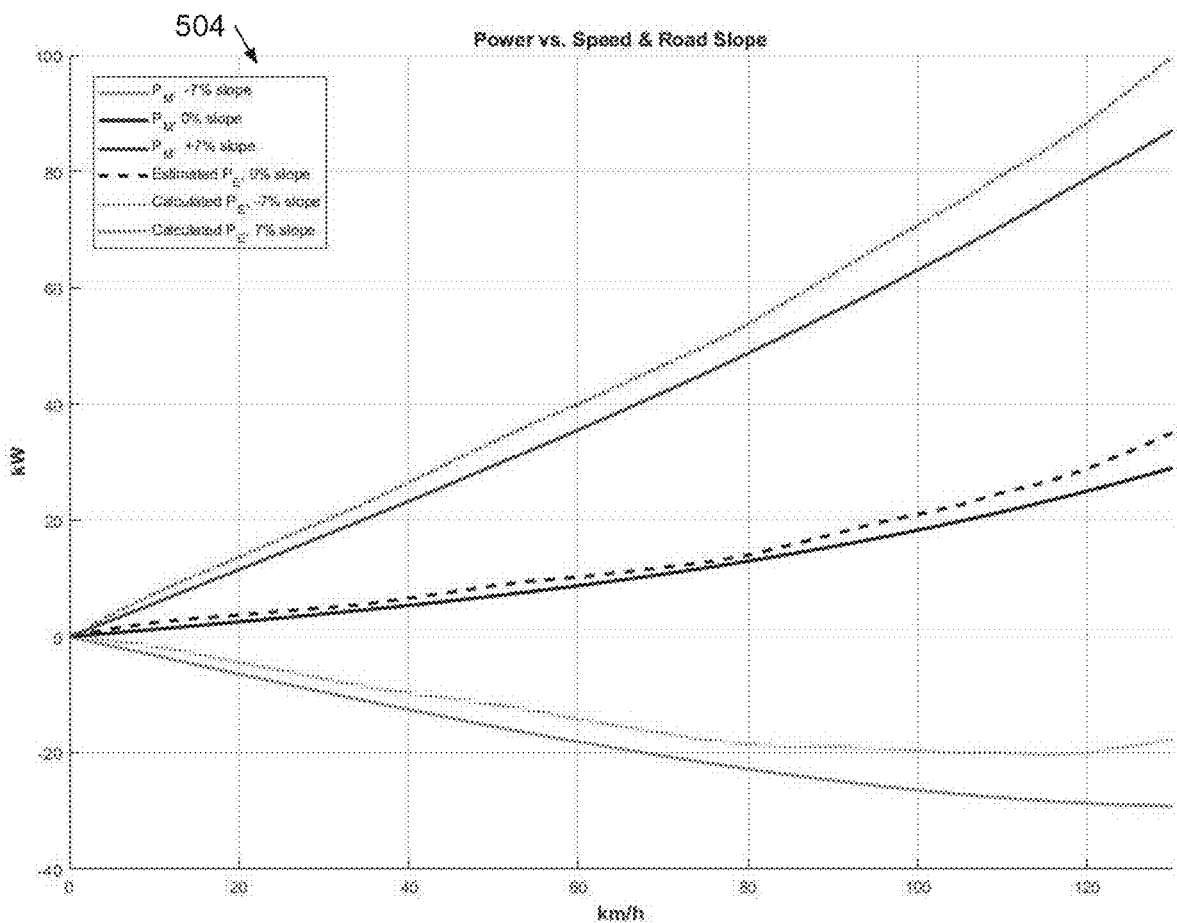

FIG. 5 illustrates a diagram of example, non-limiting energy loss tables and/or energy loss models that can be generated by the drivetrain loss component 402 in accordance with one or more embodiments described herein. Repetitive description of like elements employed in other embodiments described herein is omitted for sake of brevity. As shown, in FIG. 5, the drivetrain loss component 402 can generate and/or populate one or more exemplary loss tables 502 based on historic diving conditions (e.g., characterized by historic datasets, as described herein) to calculate one or more historic propulsive energy consumption values at a zero, or near zero, road slope. Also shown in FIG. 5, the drivetrain loss component 402 can utilize one or more loss models, such as exemplary loss model 504, to estimate the propulsive energy consumption values for the electric vehicle at various non-zero road slopes.

Figure 6:
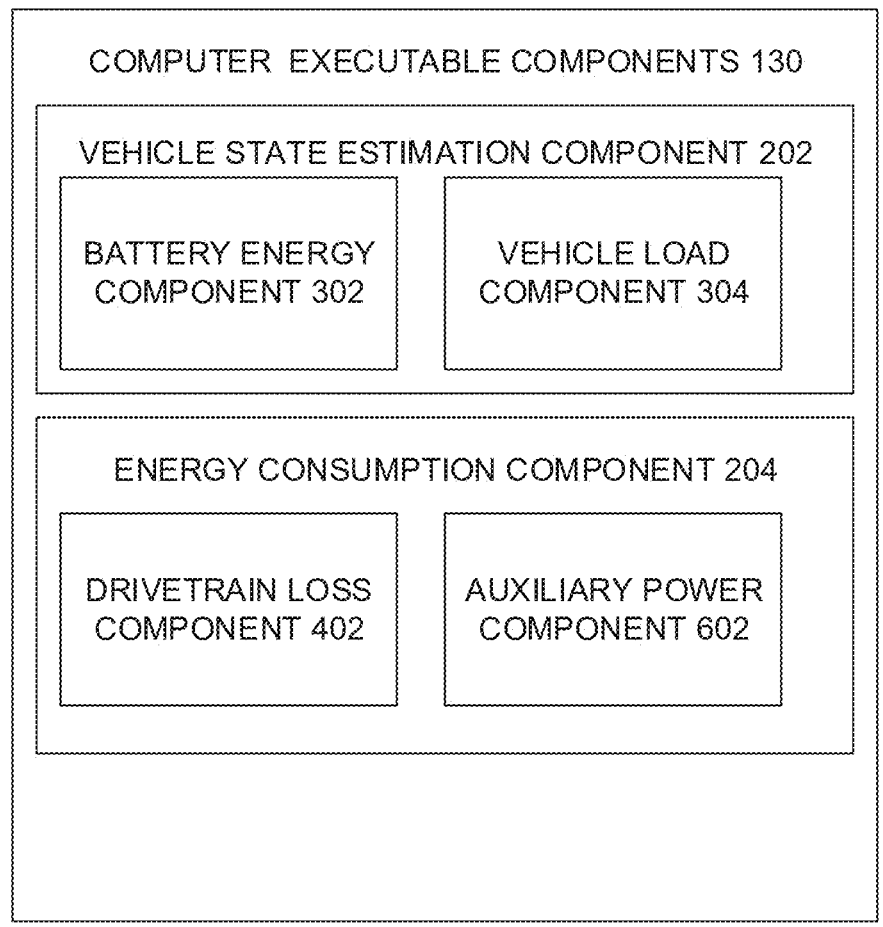
FIG. 6 illustrates a block diagram of example, non-limiting computer executable components that can facilitate incorporating an auxiliary power consumption into parameterization of an electric vehicle's energy consumption in accordance with one or more embodiments described herein.

FIG. 6 illustrates a block diagram of example, non-limiting computer executable components 130 that can facilitate parameterizing one or more energy demands of the electric vehicle 102 in accordance with one or more embodiments described herein. Repetitive description of like elements employed in other embodiments described herein is omitted for sake of brevity. As shown in FIG. 6, the energy consumption component 204 can include one or more auxiliary power components 602.

In various embodiments, the auxiliary power component 602 can facilitate the one or more vehicle computation units 134 in parameterizing energy demands associated with operating one or more of the auxiliary subsystems 122 the electric vehicle 102 along a designated travel route. For example, the energy demands can be at least partially parameterized by one or more auxiliary load predictions generated by the auxiliary power component 602. In one or more embodiments, the auxiliary load predictions can be based on a distributed power prediction approach in which energy consumption can be predicted for respective auxiliary subsystem 122 (e.g. cabin climate system, battery thermal control system, defroster system, stereo system, and/or the like). Further, one or more auxiliary load predictions can be based on a two-point approximation model, which can be defined by two constant power levels, $P_1$ & $P_2$, and two time periods, $T_1$ & $T_2$, (e.g., constituting the expected duration of the first power level and the expected transition time between the first and the second power level). The two-point approximation model can capture the behaviour of an initial transient state of the auxiliary subsystem 122 versus the following steady operation state of the auxiliary subsystem 122 (e.g. initial climatization of the compartment versus maintaining the desired comfort temperature).

For example, the two-point approximation model can be trained by the auxiliary power component 602 during a transient phase and a steady state operation phase of the auxiliary subsystems 122. During the transient phase, the auxiliary power component 602 can: upon electric vehicle 102 start-up, determine an energy deviation between an initial state and a target steady state setpoint for one or more auxiliary subsystems 122; integrate power demand and time for the one or more auxiliary subsystems 122; stop the integration when the steady state setpoint has been reached; and/or update the corresponding table data for each auxiliary subsystem 122 with the total energy consumed and the time duration required to reach steady state operation. During the steady state operation phase, the auxiliary power component 602 can update the corresponding table data for the auxiliary subsystems 122 with the average power demand during steady state operation versus current setpoint and/or ambient conditions.

In various embodiments, the auxiliary power component 602 can generate one or more auxiliary power predictor models. For example, the auxiliary power component 602 can calculate one or more energy deviations between the current state of an auxiliary subsystem 122 and the desired steady state setpoint for the auxiliary subsystem 122. Further, the auxiliary power component 602 can predict the energy demand and/or time required to reach the steady-state setpoint and/or the steady state power demand for the auxiliary subsystem 122 based on a power prediction model and/or the current setpoint energy deviation. Additionally, the auxiliary power component 602 can predict the expected time duration to traverse the designated travel route (e.g., a time to destination and/or time required to deplete the one or more batteries). Thereby, the auxiliary power component 602 can generate the two-point approximations for the power demand of each auxiliary subsystem 122 based on the preceding predictions. Further, once the auxiliary subsystems 122 reach the steady state of operation, the auxiliary power component 602 can transition to using the average auxiliary power demand during a previous time period (e.g., last 15 minutes) rather than the power prediction (e.g., to minimize the impact of power prediction model inaccuracies on parameterization of the energy consumption demands).

Figure 7:
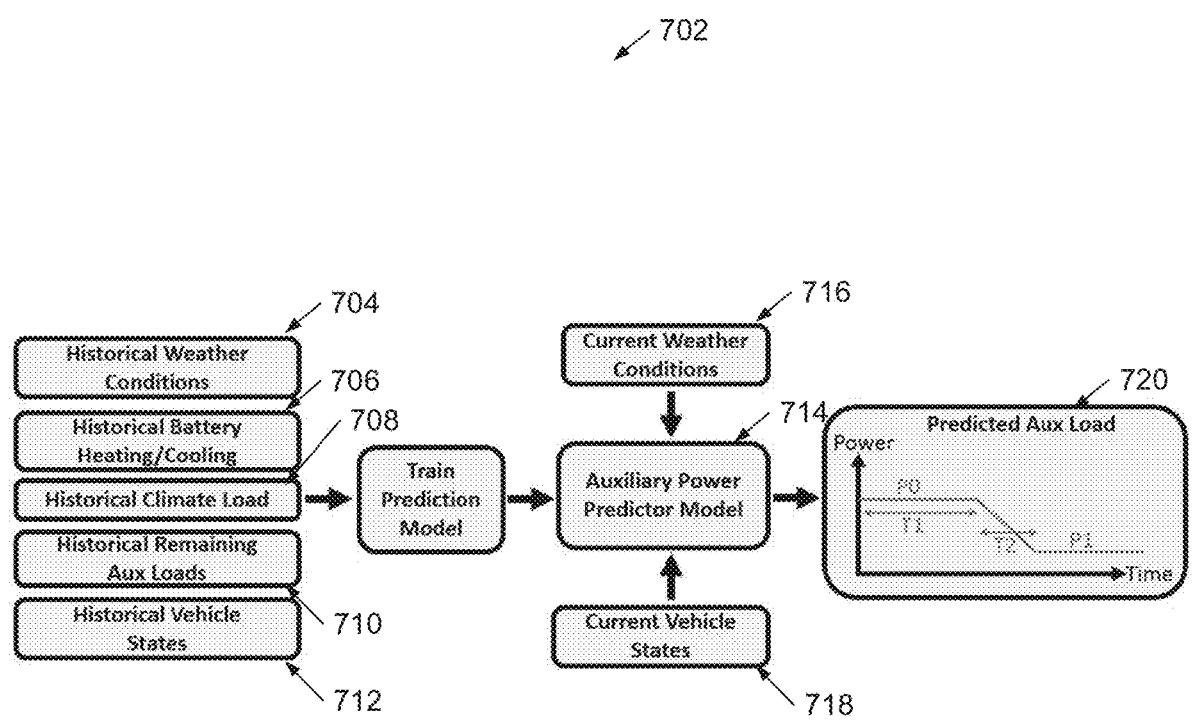
FIG. 7 illustrate an example, non-limiting auxiliary energy demand prediction process in accordance with one or more embodiments described herein.

FIG. 7 illustrates a diagram of an example, non-limiting auxiliary energy demand prediction process 702 that can be implemented by the one or more auxiliary power components 602 in accordance with one or more embodiments described herein. Repetitive description of like elements employed in other embodiments described herein is omitted for sake of brevity. As described herein, the on-board vehicle system 108 can determine and/or collect historic data regarding past operation of the electric vehicle 102. In various embodiments, the auxiliary power component 602 can analyze the historic data to facilitate one or more parameterizations of the energy demands by the one or more auxiliary subsystems 122 while traversing a designated travel route and/or based on one or more conditions expected to be experienced while traveling (e.g., expected weather conditions).

As shown in FIG. 7, example historic data that can be processed and/or collected by the on-board system 104 (e.g., via the one or more vehicle electronic systems and/or devices 108, vehicle computation units 134, and/or computer executable components 130) can include, but are not limited to: historical weather conditions 704, historical battery heating or cooling 706, historical climate energy loads 708, historical remaining auxiliary energy loads 710, historical vehicle states 712, a combination thereof, and/or the like. In accordance with various embodiments described herein, the auxiliary power component 602 can utilize the historic data to train one or more prediction models 714. Additionally, data characterizing one or more conditions expected to be experienced during designated travel plan can be incorporated into the prediction model. For example, data regarding current weather conditions 716 (e.g., facilitated by the one or more sensors 124 and/or external devices 112, such as external weather monitoring systems in communication with the on-board vehicle system 104) and/or the current state 718 of the electric vehicle 102 (e.g., facilitated by the one or more vehicle electronic systems and/or devices 108 and/or computer executable components 130, such as the vehicle state estimation component 202). As shown in FIG. 7, the prediction model can be a two-point approximation model in accordance with various embodiments described herein and/or can predict one or more auxiliary power demands 720 given the current operating conditions (e.g., regarding the electric vehicle 102 and/or the environment) and based on past operation of the electric vehicle 102.

Figure 8:
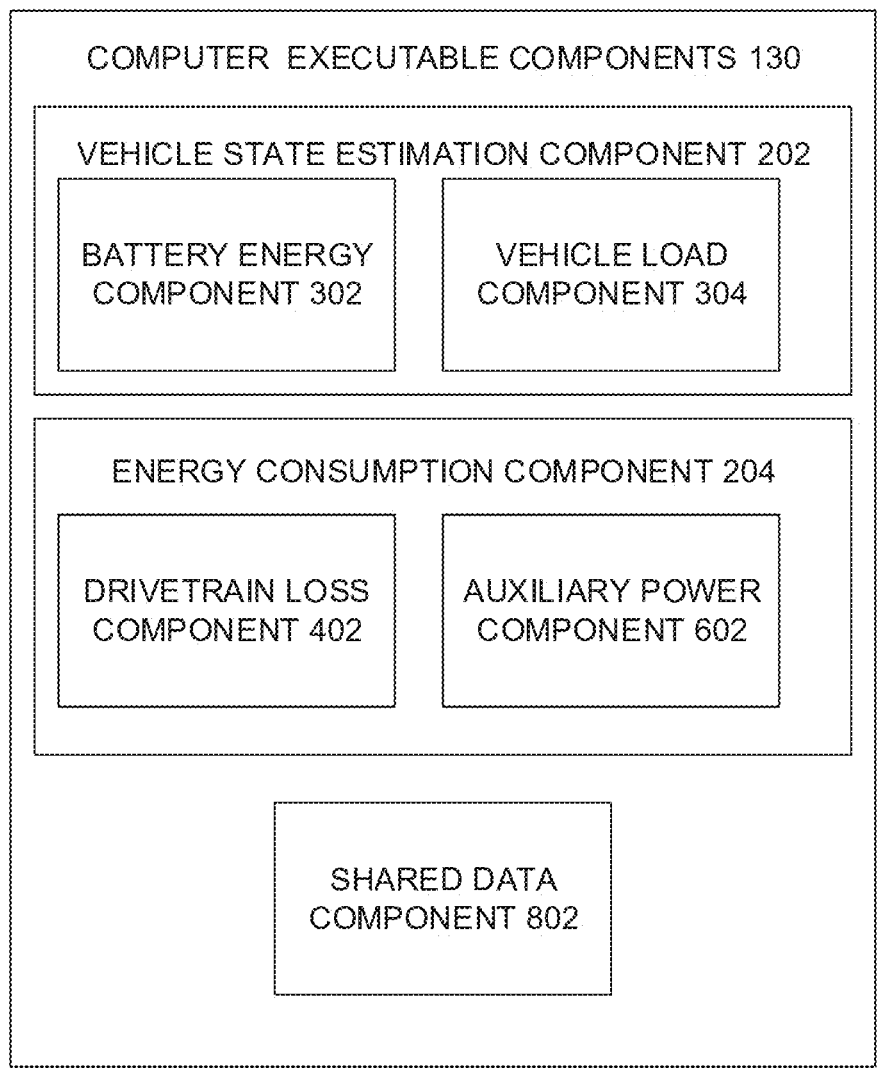
FIG. 8 illustrates a block diagram of example, non-limiting computer executable components that can utilize machine learning to incorporate lessons learned from other electric vehicles in an electric vehicles energy consumption parameterization in accordance with one or more embodiments described herein.

FIG. 8 illustrates a block diagram of example, non-limiting computer executable components 130 that can further comprise one or more shared data components 802 in accordance with one or more embodiments described herein. Repetitive description of like elements employed in other embodiments described herein is omitted for sake of brevity. In various embodiments, the one or more shared data components 802 can coordinate historic data shared with the electric vehicle 102 by a second electric vehicle. For example, the second electric vehicle 102 can be one or more of the external devices 112 and can communicate with the on-board vehicle system 104 via the communications unit 136 and/or one or more networks 114.

In one or more embodiments, the electric vehicle 102 can receive historic data generated and/or collected by one or more on-board vehicle systems 104 of a second electric vehicle 102. The shared data component 802 can analyze the shared historic data from the second electric vehicle 102 to determine whether the second electric vehicle 102 has a similar operating state as the electric vehicle 102. For example, the shared data component 802 can determine the second vehicle's manufacture, model, registration number, vehicle identification number ("VIN"), and/or the like. Wherein the shared data component 802 determines that the second electric vehicle 102 has one or more predefined vehicle characteristics (e.g., battery capacity, type of electric motor, type of transmission, vehicle model, and/or the like) in common with the electric vehicle 102, the shared data component 802 can incorporate the shared historic data into the historic data stored in the one or more memories 126 to contribute to the various energy consumption parameterizations described herein.

Figure 9:
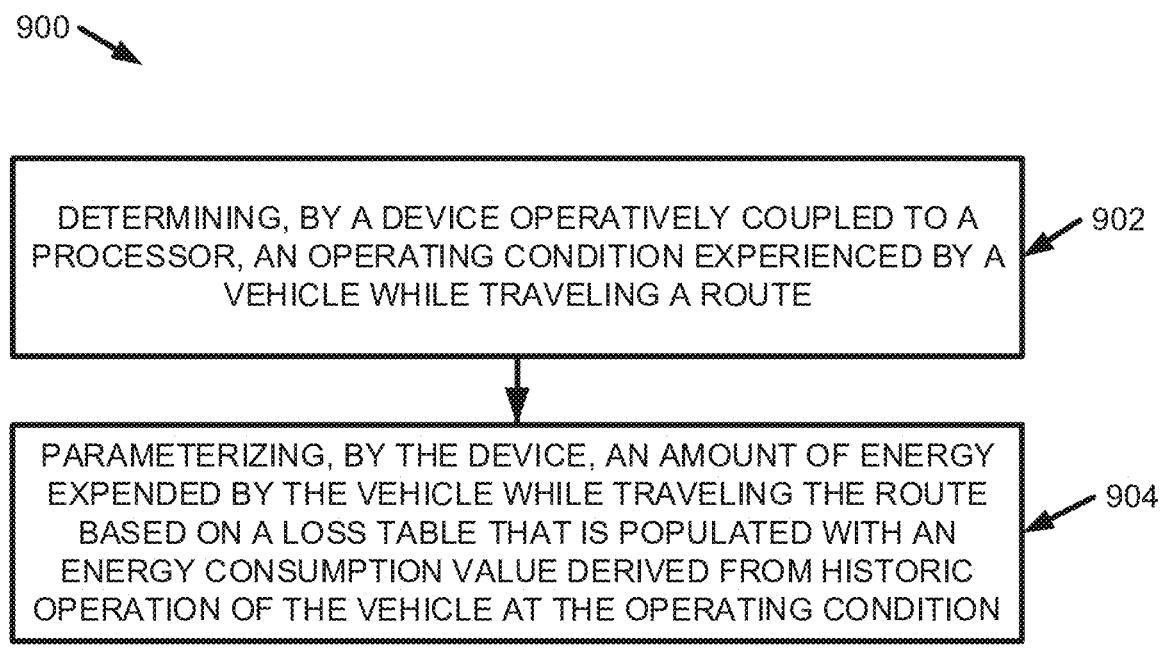
FIG. 9 illustrates a flow diagram of an example, non-limiting computer-implemented method that can facilitate parameterizing an electric vehicle's energy consumption in accordance with one or more embodiments described herein.

FIG. 9 illustrates a flow diagram of an example, non-limiting computer-implemented method 900 that can facilitate parameterizing energy consumption demands for an electric vehicle with regards to a designated travel route, conditions expected to be experienced on the travel route, and/or historic operating conditions in accordance with one or more embodiments described herein. Repetitive description of like elements employed in other embodiments described herein is omitted for sake of brevity.

At 902, the computer-implemented method 900 can comprise determining (e.g., via the vehicle state estimation component 202), by a device (e.g., one or more vehicle computation units 134) operatively coupled to a processor 116, one or more operating conditions experienced by a vehicle while traveling a route. In accordance with various embodiments described herein, the one or more operating conditions can regard, for example: vehicle speed, road slope, electrical power of one or more motors of the vehicle (e.g., electric motors of an electric vehicle 102), auxiliary power demands, ambient temperature, battery temperature, vehicle mass, road load coefficients, environmental conditions, a state of the vehicle's battery (e.g., charge level), a combination thereof, and/or the like.

At 904, the computer-implemented method 900 can comprise parameterizing (e.g., via the energy consumption component 204, by the device (e.g., one or more vehicle computation components 134), an amount of energy expended by the vehicle while traveling the route based on one or more loss tables that can be populated with one or more energy consumption values derived from historic operation of the vehicle at the operating condition. In accordance with one or more embodiments described herein, the parameterizing at 904 can regard a state of the vehicle's battery (e.g., the battery's energy level and/or inherent energy loss), the vehicle's road load coefficients and/or mass, energy loss associated with one or more transmissions and/or electrical motors of the vehicle, and/or auxiliary power demands (e.g., associated with operation of one or more auxiliary subsystems 122 of the vehicle). For example, at 904 the compute-implemented method 900 can parameterize energy consumption values associated with drivetrain energy loss at 904.

Figure 10:
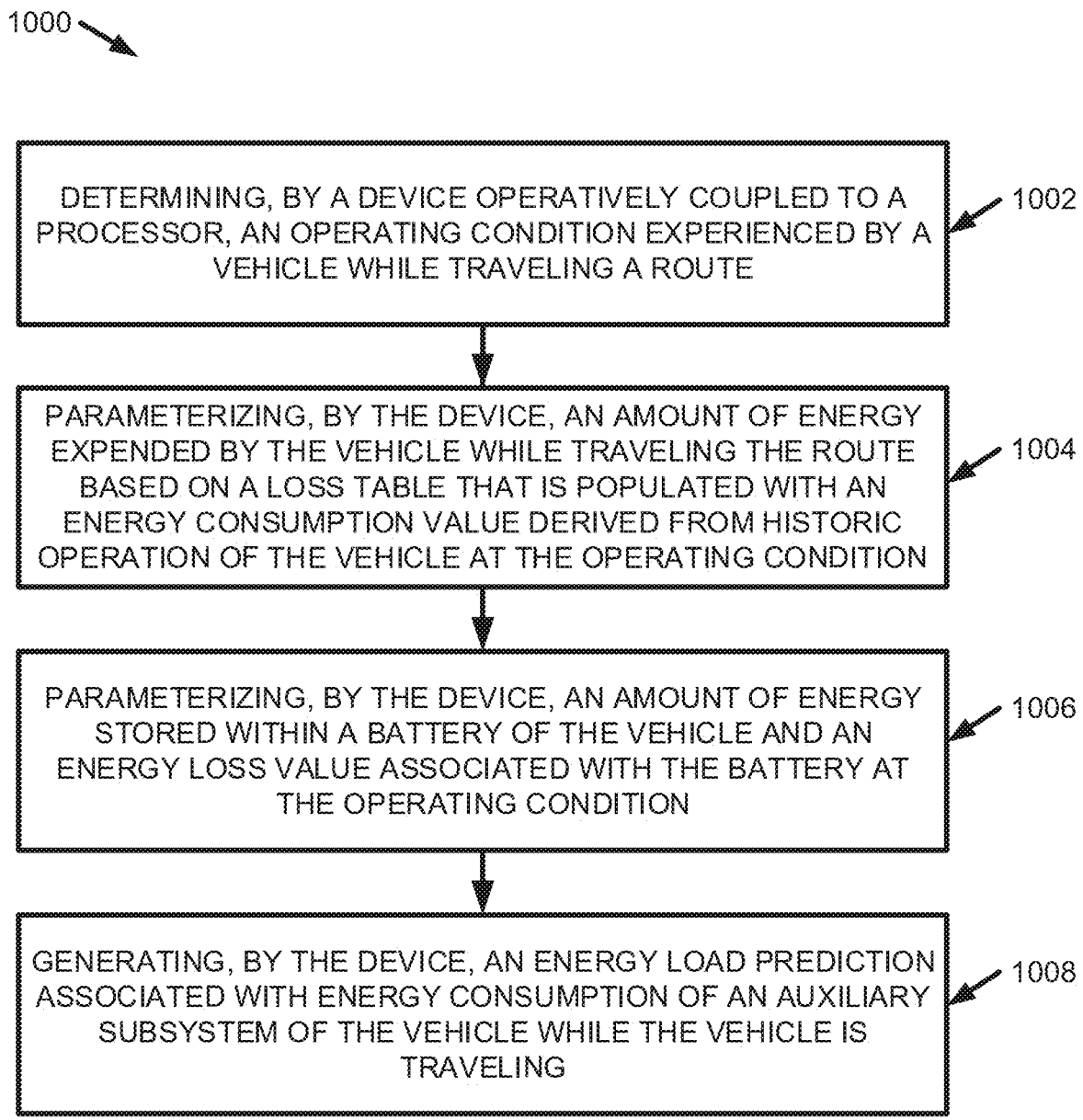
FIG. 10 illustrates a flow diagram of an example, non-limiting computer-implemented method that can facilitate parameterizing an electric vehicle's energy consumption in accordance with one or more embodiments described herein.

FIG. 10 illustrates a flow diagram of an example, non-limiting computer-implemented method 1000 that can facilitate parameterizing energy consumption demands for an electric vehicle with regards to a designated travel route, conditions expected to be experienced on the travel route, and/or historic operating conditions in accordance with one or more embodiments described herein. Repetitive description of like elements employed in other embodiments described herein is omitted for sake of brevity.

At 1002, the computer-implemented method 1000 can comprise determining (e.g., via the vehicle state estimation component 202), by a device (e.g., one or more vehicle computation units 134) operatively coupled to a processor 116, one or more operating conditions experienced by a vehicle while traveling a route. In accordance with various embodiments described herein, the one or more operating conditions can regard, for example: vehicle speed, road slope, electrical power of one or more motors of the vehicle (e.g., electric motors of an electric vehicle 102), auxiliary power demands, ambient temperature, battery temperature, vehicle mass, road load coefficients, environmental conditions, a state of the vehicle's battery (e.g., charge level), a combination thereof, and/or the like.

At 1004, the computer-implemented method 1000 can comprise parameterizing (e.g., via the energy consumption component 204, by the device (e.g., one or more vehicle computation components 134), an amount of energy expended by the vehicle while traveling the route based on one or more loss tables that can be populated with one or more energy consumption values derived from historic operation of the vehicle at the operating condition. In accordance with one or more embodiments described herein, the parameterizing at 1004 can regard one or more drivetrain energy loss values expected to be experienced by the vehicle while traveling the route. For example, the parameterizing at 1004 can comprise generating (e.g., via drivetrain loss component 402) one or more energy consumption values populated within the one or more loss tables, wherein the energy consumption values can characterize an energy efficiency of a drivetrain of the vehicle at the operating condition (e.g., the expected road slope and/or vehicle speed) based on the historic operation of the vehicle (e.g., past operation of the vehicle at zero, or near zero, road slope).

At 1006, the computer-implemented method 1000 can comprise parameterizing, (e.g., via the battery energy component 302), by the device (e.g., one or more vehicle computation units 134), an amount of energy stored within a battery of the vehicle and an energy loss value associated with the battery at the operating condition. Further, at 1008 the computer-implemented method 1000 can comprise generating (e.g., via auxiliary power component 602), by the device (e.g., one or more vehicle computation units 134), an energy load prediction associated with energy consumption of one or more auxiliary subsystems 122 of the vehicle while the vehicle is traveling. For example, the parametrizing at 1008 can be performed in accordance with auxiliary energy demand prediction process 702.

The various embodiments described herein can be implemented on board an electric vehicle 102 to parameterize energy consumption. Further, the generated parameters can be based on past operating conditions regarding the electric vehicle 102, and/or can adapt to one or more real-time, or near real-time operating conditions. Moreover, the generated parameters can be formatted and shared with one or more vehicle energy models to determine one or more intelligent trip plans.

The one or more embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture ("ISA") instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays ("FPGA"), or programmable logic arrays ("PLA") can execute the computer readable program instructions by utilizing state information of the computer readable program instructions to personalize the electronic circuitry, in order to perform aspects of the present invention.

Various aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit ("ASIC"), a digital signal processor ("DSP"), a field programmable gate array ("FPGA"), a programmable logic controller ("PLC"), a complex programmable logic device ("CPLD"), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments, but one of ordinary skill in the art can recognize that many further combinations and permutations of these embodiments are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What is claimed is:

1. A system, comprising:
   a processor that executes computer executable components stored in a memory, wherein the computer executable components comprise;
      a vehicle state estimation component that determines an operating condition experienced by a vehicle while traveling a route; and
      an energy consumption component that parameterizes an amount of energy expended by the vehicle while traveling the route based on a loss table that is populated with an energy consumption value derived from historic operation of the vehicle at the operating condition, wherein the amount of energy expended by the vehicle is parameterized based on a two-point approximation model that comprises a transient phase that captures respective first behaviors of auxiliary subsystems of the vehicle from respective startup states of the auxiliary subsystems until respective steady states of the auxiliary subsystems, and a steady state operating phase that captures respective second behaviors of the auxiliary subsystems associated with the respective steady states of the auxiliary subsystems.

2. The system of claim 1, wherein the amount of energy is a first amount of energy, and further comprising:
   a battery energy component that parameterizes a second amount of energy stored within a battery of the vehicle and an energy loss value associated with the battery at the operating condition.

3. The system of claim 1, further comprising:
   a drivetrain loss component that generates the energy consumption value populated within the loss table, and wherein the energy consumption value characterizes an energy efficiency of a drivetrain of the vehicle at the operating condition based on the historic operation of the vehicle.

4. The system of claim 1, wherein the operating condition includes a speed of the vehicle while traveling the route and a slope of a terrain traversed by the vehicle while traveling the route.

5. The system of claim 1, further comprising:
   an auxiliary power component that generates an energy load prediction associated with energy consumption of an auxiliary subsystem of the auxiliary subsystems of the vehicle while the vehicle is traveling the route.

6. The system of claim 1, further comprising:
   an auxiliary power component the predicts an energy demand of an auxiliary subsystem of the auxiliary subsystems to reach the respective steady state from the respective startup state.

7. The system of claim 2, wherein energy consumption component predicts, via a model, using the parameterizations of the first amount of energy, the second amount of energy, and the energy loss value a remaining battery charge level of the vehicle at a defined future time.

8. The system of claim 1, further comprising:
   a data sharing component that further populates the loss table with a second energy consumption value based on historic operation of a second vehicle.

9. A computer-implemented method, comprising:
   determining, by a device operatively coupled to a processor, an operating condition experienced by a vehicle while traveling a route; and
   parameterizing, by the device, an amount of energy expended by the vehicle while traveling the route based on a loss table that is populated with an energy consumption value derived from historic operation of the vehicle at the operating condition, wherein the amount of energy expended by the vehicle is parameterized based on a two-point approximation model that comprises a transient phase that captures respective first behaviors of auxiliary subsystems of the vehicle from respective startup states of the auxiliary subsystems until respective steady states of the auxiliary subsystems, and a steady state operating phase that captures respective second behaviors of the auxiliary subsystems associated with the respective steady states of the auxiliary subsystems.

10. The computer-implemented method of claim 9, wherein the amount of energy is a first amount of energy, and further comprising:
    parameterizing, by the device, a second amount of energy stored within a battery of the vehicle and an energy loss value associated with the battery at the operating condition.

11. The computer-implemented method of claim 9, further comprising:
    generating, by the device, the energy consumption value populated within the loss table, and wherein the energy consumption value characterizes an energy efficiency of a drivetrain of the vehicle at the operating condition based on the historic operation of the vehicle.

12. The computer-implemented method of claim 9, wherein the operating condition includes a speed of the vehicle while traveling the route and a slope of a terrain traversed by the vehicle while traveling the route.

13. The computer-implemented method of claim 9, further comprising:
generating, by the device, an energy load prediction associated with energy consumption of an auxiliary subsystem of the auxiliary subsystems of the vehicle while the vehicle is traveling the route.

14. The computer-implemented method of claim 9, further comprising:
predicting, by the device, an energy demand of an auxiliary subsystem of the auxiliary subsystems to reach the respective steady state from the respective startup state.

15. A computer program product for parameterizing vehicle energy consumption, the computer program product comprising a computer readable storage medium having program instructions embodied therewith, the program instructions executable by a processor to cause the processor to:
determine an operating condition experienced by a vehicle while traveling a route; and
parametrize an amount of energy expended by the vehicle while traveling the route based on a loss table that is populated with an energy consumption value derived from historic operation of the vehicle at the operating condition, wherein the amount of energy expended by the vehicle is parameterized based on a two-point approximation model that comprises a transient phase that captures respective first behaviors of auxiliary subsystems of the vehicle from respective startup states of the auxiliary subsystems until respective steady states of the auxiliary subsystems, and a steady state operating phase that captures respective second behaviors of the auxiliary subsystems associated with the respective steady states of the auxiliary subsystems.

16. The computer program product of claim 15, wherein the amount of energy is a first amount of energy, and the program instructions further cause the processor to:
parametrize a second amount of energy stored within a battery of the vehicle and an energy loss value associated with the battery at the operating condition.

17. The computer program product of claim 15, wherein the program instructions further cause the processor to:
generate the energy consumption value populated within the loss table, and wherein the energy consumption value characterizes an energy efficiency of a drivetrain of the vehicle at the operating condition based on the historic operation of the vehicle.

18. The computer program product of claim 15, wherein the operating condition includes a speed of the vehicle while traveling the route and a slope of a terrain traversed by the vehicle while traveling the route.

19. The computer program product of claim 17, wherein the program instructions further cause the processor to:
generate an energy load prediction associated with energy consumption of an auxiliary subsystem of the auxiliary subsystems of the vehicle while the vehicle is traveling the route.

20. The computer program product of claim 19, wherein the program instructions further cause the processor to:
predict an energy demand of an auxiliary subsystem of the auxiliary subsystems to reach the respective steady state from the respective startup state.

* * * * *